Feb. 24, 1925.

T. J. SULLIVAN

COTTON DROPPER

Filed Nov. 26, 1923

1,527,494

3 Sheets-Sheet 3

Inventor
T. J. SULLIVAN

By

Attorney

Patented Feb. 24, 1925.

1,527,494

UNITED STATES PATENT OFFICE.

THOMAS J. SULLIVAN, OF COAHOMA, TEXAS.

COTTON DROPPER.

Application filed November 26, 1923. Serial No. 676,906.

*To all whom it may concern:*

Be it known that I, THOMAS J. SULLIVAN, a citizen of the United States of America, residing at Coahoma, in the county of Howard and State of Texas, have invented certain new and useful Improvements in Cotton Droppers, of which the following is a specification.

This invention relates to new and useful improvements in cotton droppers.

In feeding seed cotton to a battery of gins it is customary to lift the cotton from the wagon by a pneumatic conveyor and deposit said cotton upon a distributor belt which delivers it to the various gins. Some means for trapping the cotton and segregating the air currents as maintaining the suction must be employed.

The object of my invention is to provide improved means for trapping the cotton and segregating the air currents, whereby the cotton may be dropped by gravity onto the distributor belt and the air currents conveyed from the point of separation without dissipation.

A further object is to provide an amplified screening surface through which the air currents may escape freely and whereby the cotton will not adhere to such screens.

A particular object is to provide a revolving gate having air-tight contact with its housing, whereby the flow of back air currents into the dropper is prevented and the pneumatic conveyor is maintained.

A construction designed to carry out the invention will be hereinafter described together with other features of the invention.

Figure 1:
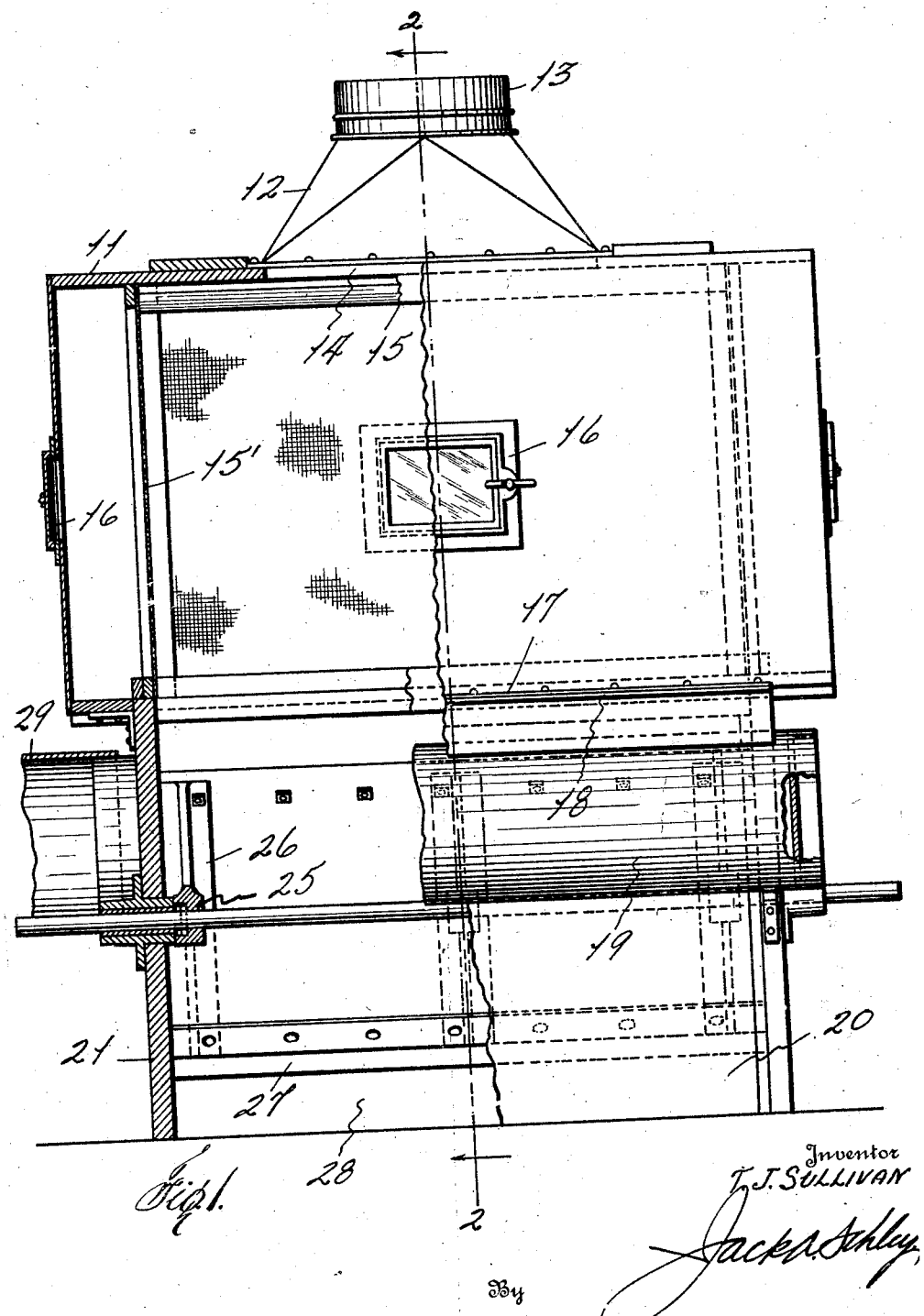
Figure 2:
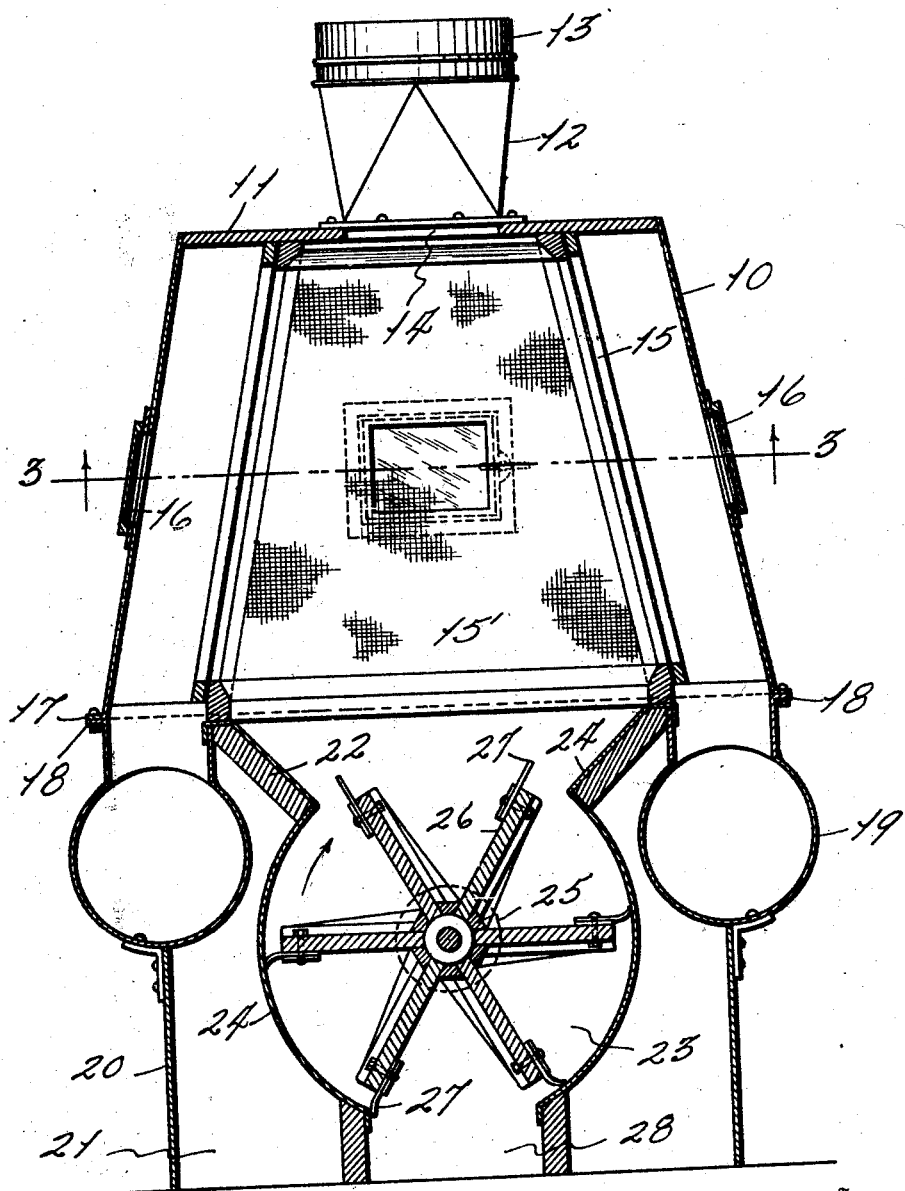
Figure 3:
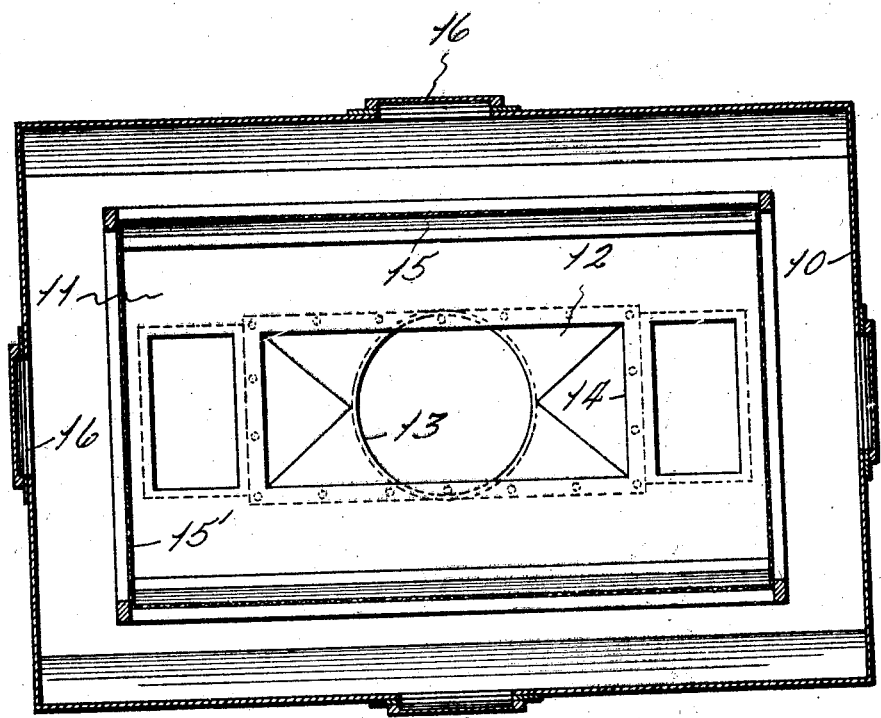
Figure 4:
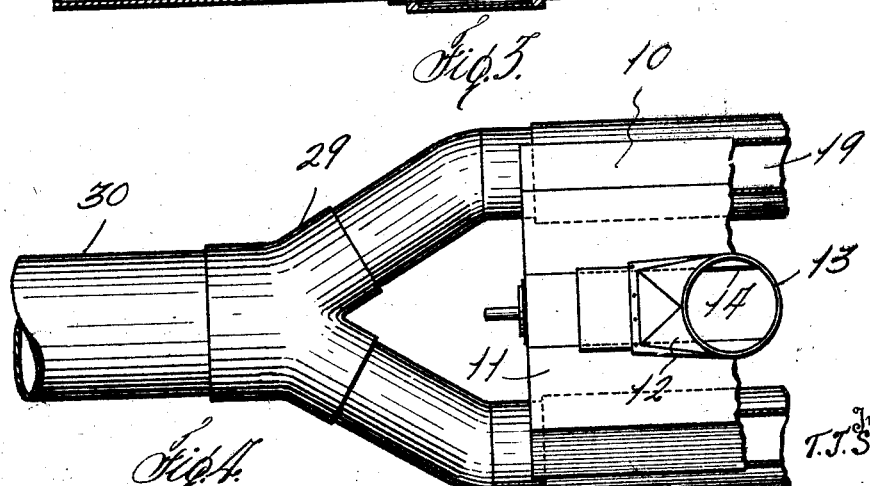

The invention will be more readily understood from a reading of the following specification and by reference to the accompanying drawings, in which an example of the invention is shown, and wherein:

Fig. 1 is a view of an apparatus constructed in accordance with my invention, a portion being shown in side elevation and a portion in section, Fig. 2 is a vertical sectional view taken on the line 2—2 of Fig. 1, Fig. 3 is a cross-sectional view taken on the line 3—3 of Fig. 2 and looking in the direction of the arrows, and Fig. 4 is a partial plan view showing the air flue connections.

In the drawings the numeral 10 designates a rectangular housing having upwardly inclined sides, vertical ends and a flat top 11 in which a flue head 12 is centrally secured. The head has flaring ends and a collar 13 at its upper end to which the pneumatic conveyor (not shown) is attached. By reason of its downward flare of the ends of the head, the cotton and air discharged from the conveyer are given full opportunity to spread and pass downward through the opening 14 into the housing. Within the housing is arranged a screened separating chamber having two inclined sides 15 and two vertical ends 15' formed of wire netting or other foraminous material. The sides of the chamber conform to the sides of the housing and are spaced therefrom. On the sides and ends of the housing, glass covered openings 16 may be provided for inspecting the screens.

It is pointed out that the amplified screen surface is sufficient to afford such a free escape of the air as to avoid clogging of the cotton or the adhering of the same to inner sides of the screens. The downward and outward inclination also tends to free the cotton. The air passes out through the screens and the cotton falls through the bottom of the housing.

The ends of the housing have flanges 17 along each lower edge which are bolted to the flanges 18 of the side flues 19 supported on side aprons 20. End walls 21 support the ends of the housing. The bottom of the separating chamber is open and a hopper 22 is built thereunder. A cylindrical trapping chamber 23 extends longitudinally under the hopper and is formed of sheets of metal 24, which may be carried upward and used to face the sides of the hopper. A revolving gate 25 having radial longitudinal blades 26 forming pockets therebetween, is mounted in the end walls 21 and suitably revolved. Flexible wiping strips 27 of rubberized fabric or other material, are secured to the outer edges of the blades and wipe the sides of the chamber 23, said gate revolving in a clockwise direction.

A throat 28 is provided below the chamber 23 and may be suitably connected with the distributor belt housing (not shown). By provision of the wipers, the air cannot pass back from the throat into the cylinder or housing and the pockets form receptacles for the falling cotton, which pockets drop the cotton through the throat as the gate revolves.

The air which is discharged through the screens 15 and 15' enters the flues 19 on each side. These flues have one end closed. The opposite ends of the flues are connected with a Y-coupling 29 which in turn has connection with an air suction pipe 30.

In operation the air suction created through the pipe 30 causes the air currents entering the housing from the pneumatic conveyor through the head 12, to pass through the screen sides 15 and 15' of the separating chamber. These air currents convey the cotton into the chamber and owing to the large screen area, said cotton is immediately released so as to fall into the hopper 22 without collecting on the screens. The air currents after passing through the screen enter the flues 19 and pass to the pipe 30, whereby the vacuum is maintained.

The cotton which falls into the hopper is received in the pockets of the gate 25 and dropped into the throat 28 as the gate is revolved. The wipers 27 prevent a backward or upward passage of air, which would interfere with the pneumatic conveyor and the falling of the cotton.

Various changes in the size and shape of the various parts, as well as modifications and alterations may be made within the scope of the appended claims.

What I claim, is:

1. In a cotton dropper, a housing having an entrance at its top for receiving air conveyed cotton, a rectangular separating chamber within the housing having a downwardly flared and amplified screening surface, air conveyors connected with the housing outside of the separating chamber, and a revolving air excluding gate for receiving and discharging cotton from the bottom of the chamber.

2. In a cotton dropper, a housing having an entrance at its top for receiving air conveyed cotton, a rectangular separating chamber within the housing having a downwardly flared and amplified screening surface, air conveyors connected with the housing outside of the separating chamber, a hopper below the separating chamber receiving cotton therefrom, a cylindrical chamber below the hopper, and a revolving gate in the cylindrical chamber having cotton receiving pockets and flexible wipers engaging the sides of said chamber.

3. In a cotton dropper, a housing having an entrance at its top for receiving air conveyed cotton, a screened separating chamber within the housing having a downwardly flared and amplified screening surface, means for conveying air from the space between the housing and the chamber, and a revolving air excluding gate for receiving and discharging cotton from the bottom of the chamber.

4. In a cotton dropper, a housing having an entrance at its top for receiving air conveyed cotton, a separating chamber within the housing and spaced therefrom, said chamber having inclined and amplified screening surfaces, means for conducting air from the space between the housing and the chamber, a hopper below the chamber receiving cotton therefrom, a cylindrical chamber below the hopper, and a revolving gate in the cylindrical chamber for dropping the cotton and excluding the upward passage of air.

5. In a cotton dropper, a housing having an entrance at its top for receiving air conveyed cotton, a separating chamber within the housing and spaced therefrom, said chamber having inclined and amplified screening surfaces, air conducting flues at each side and bottom of the space between the housing and chamber, a hopper below the chamber receiving the cotton therefrom, a cylindrical chamber below the hopper, and a revolving gate in the cylindrical chamber for dropping the cotton and excluding the upward passage of air.

In testimony whereof I affix my signature.

THOMAS J. SULLIVAN.